Patented July 16, 1940

2,207,752

UNITED STATES PATENT OFFICE 2,207,752

PROCESS FOR CRYSTALLIZING NAPHTHALENE

Stuart Parmelee Miller, Scarsdale, N. Y., assignor to The Barrett Company, New York, N. Y., a corporation of New Jersey No Drawing. Application April 20, 1938, Serial No. 203,116

8 Claims. (Cl. 260—674)

This invention relates to the crystallization of naphthalene. In its preferred aspects, it is directed to a method for crystallization of crude naphthalene whereby its recovery and purification are effected in a more rapid and efficient manner than by known methods.

In my Patent No. 2,078,963 I have described purification of crude naphthalene by crystallization from sodium hydroxide solution. In accordance with that process the crude naphthalene, for example a naphthalene having a solidification point of 64° C. and containing relatively inert impurities, such as hydrocarbon oils, and chemically relatively reactive impurities, such as tar acids, is agitated with an aqueous solution of dilute sodium hydroxide at a temperature above the melting point of the crude naphthalene. The mixture is then cooled by the addition of sodium hydroxide solution to effect crystallization of the naphthalene. The crystals may be separated from the liquid constituents of the mixture by means of a centrifuge. By repeating the process a naphthalene of relatively high purity, of say 78° to 78.5° C. solidification point, may be obtained.

While the process of the invention herein described is of particular value in the purification method described in the above patent, it is also applicable to crystallization of naphthalene in admixture with aqueous liquids in general; for example, to the crystallization processes of United States Patents 1,448,688 and 1,481,197 of David F. Gould.

The successful commercial production of naphthalene refined to various degrees of purity involves the solution of a combination of problems largely specific and peculiar to such operations. These problems arise from the following conditions:

a. Large tonnage of material to be handled.
b. Close control of solidification point required in final products.
c. High degree of purity required in the more highly refined grades.
d. Difficulty of complete removal of attendant impurities.
e. Occurrence of naphthalene in different states of crystal aggregation and tendency to crystallize non-uniformly.
f. Tendency of naphthalene to form dense and heat-insulating layers of crystals on cooling coils and other cooling surfaces.

Among the objects of the present invention are: to produce naphthalene economically in the form of aggregates of individual crystals, individual crystals being firmly bonded together along their basal planes, such as described in United States Patent No. 1,448,688 to David F. Gould; to provide process steps which permit precise control of type and physical state of naphthalene crystals; to refine naphthalene to any desired solidification point and purity; to produce by crystallization alone highly refined grades that have heretofore been made commercially only by processes involving washing with concentrated sulfuric acid or sublimation or both; to eliminate repeated handling of the naphthalene crystals in the process; to reduce the apparatus investment required; to reduce labor required; to carry out, if desired, the major part of the process in one piece of apparatus instead of in several; to reduce or eliminate, if desired, the necessity for centrifuges, hydraulic presses, filter presses and like apparatus; to reduce the losses of naphthalene incident to washing with sulfuric acid; to reduce amount of sulfuric acid required; to reduce losses of hydrocarbons other than naphthalene commonly lost by present methods; to produce naphthalene of quality higher than economically feasible by present methods; to provide for relatively sharp separation of naphthalene from attendant oily impurities, thereby producing these by-product oils relatively free from naphthalene; and to obtain maximum yields of naphthalene of satisfactory quality.

In carrying out prior processes in which crystallization of naphthalene is effected in contact with aqueous solution, it has been difficult to obtain the naphthalene product in the form of crystals which may be easily freed of liquid impurities. Thus the naphthalene tends, during crystallization to form certain amounts of crystal clusters or lumps from which the oily impurities cannot readily be removed. Likewise there are formed large numbers of individual crystals or crystal aggregates of size considerably smaller than desired; these fine crystals cause the retention by capillary attraction of unsatisfactorily large amounts of liquid hydrocarbon impurities. This lack of uniformity of size of naphthalene crystals, as exemplified by presence of lumps or clusters and of undesirably fine crystals, imposes burdens of cost and disadvantages in lowering of quality which are overcome by the process of my invention. While it is theoretically possible by careful regulation of cooling conditions and adequate agitation to obtain crystals of satisfactory size and shape intermediate the above unsatisfactory extremes, in practical plant operation this ideal condition is actually only approximated; to the extent it is not realized the cost of refined naphthalene is increased thru loss of yield or necessity for reworking or both, and quality is impaired.

Furthermore, when caustic soda or other aqueous solution which it is desired to conserve is employed for the crystallization and especially when it is to be reused, it becomes necessary to remove heat from the solution by some external cooling means. In order to recover a maximum of the naphthalene product from the crude material, it is necessary to cool the solution to a temperature not far above, or even below, that of the atmosphere. While cooling to around 45° C. under usual weather conditions may be effected readily enough by ordinary heat exchange methods, the cooling problem becomes more difficult as the temperature approaches atmospheric. If only the direct addition of water or aqueous solution at about room temperature, 25° C. for instance, is depended upon to cool the mixture from a temperature of 65° C. down to 30° C., between six and seven times as much cooling solution must be added as there is mixture to be cooled. In view of the difficulties involved, among which is the large amount of cooling fluid required, it has been unfeasible in many instances, especially in warm weather, to effect sufficient cooling to recover more than 70% to 75% of the total contained naphthalene, the balance remaining dissolved in the separated hydrocarbon oil impurities.

Another difficulty encountered in circulating cooling liquid from crystallizing tanks through coolers for reuse is the formation of naphthalene deposits on coils or other cooling surfaces. These deposits result from the further cooling of oil entrained in the cooling liquid on coming in contact with the cooling surfaces; they adhere to the latter and crystallize, forming a layer of oily naphthalene crystals which reduces the cooling efficiency of the equipment and requires periodic removal.

The above discussion applies to the process which is believed to represent so far the most advanced practice in producing purified or refined naphthalene and which has been operated on a large scale. It has been possible to make many desired grades of refined naphthalene by careful control of operations, by some sacrifice of cost and of yield, and by including or adding sufficient purification steps of one sort or another. In the embodiments heretofore available, however, the process has had inherent defects, namely the very extensive plant required for its operation, the investment in and maintenance of which constitute a heavy charge on the product, and the impossibility of realizing or approaching closely in practice the yields and quality of naphthalene theoretically possible.

By operating in accordance with the present invention, I have found that the formation of undesirably large crystal clusters or lumps and especially of undesirably fine naphthalene crystals or crystal aggregates is avoided, that the desirable species of crystal aggregates disclosed in the Gould United States Patent No. 1,448,688 may be obtained, that the temperature may without difficulty be reduced sufficiently to recover all the naphthalene practically recoverable, and that the operation if desired may be carried out in one vessel with suitable auxiliaries, thereby doing away with much of the extensive equipment previously required and correspondingly reducing the necessary investment and maintenance. Since the entire crystallization and purification operation may be conducted in one piece of apparatus, thus eliminating several pieces of equipment and process steps, the opportunities for variation in control and attendant variations in yield and quality characteristic of the earlier methods may be substantially eliminated with the result that yields and quality of finished product are sharply improved and separated by-product oils are relatively free of naphthalene.

While the major commercial advantages of my process are realized in the refining and purification of naphthalene, in some cases a certain amount of benefit may be derived by using it to convert already purified naphthalene of undesirable physical form into the characteristic type and size of crystals described below, without substantial rise in solidification point.

I obtain the above results by extracting heat from a liquefied-naphthalene-aqueous-liquid mixture by evaporating a part of the liquid therefrom.

The evaporation may be effected by reducing the pressure on the mixture to a sufficient extent to cause ebullition at the prevailing temperature without the application of external heat. The aqueous liquid should preferably have a vapor pressure substantially above that of the naphthalene at the temperatures involved, but this is the case with practically all aqueous solutions having a reasonable degree of dilution, and solutions used in previously known naphthalene crystallization operations may be used satisfactorily.

The proper rate of cooling may be obtained in carrying out my process by conducting the evaporation so that the time in hours "$y$" required to crystallize a weight of actual naphthalene equal to 1% of that originally present in the crude being treated is not less than $$\frac{x}{240}$$

where $x$ represents the height in feet of the initial layer of the molten crude.

It has been found that the above algebraic expression is applicable in the treatment of crude naphthalene in crystallizers of various sizes and shapes. Thus the conditions are applicable with crystallizers having a diameter as small as 5 feet and as large as 15 feet, and with naphthalene layers having a depth as little as 1 and as much as 12 or 15 feet.

The time $y$, defined in the above equation, may be increased very greatly beyond the minimum limit, $$\frac{x}{240}$$

without seriously impairing the quality of the crystals produced; good results can be obtained when $$y=\frac{x}{15}$$

and even slower rates of crystallization may be used when economically feasible. Preferably the rate should be regulated so that the time $y$ lies between $$\frac{x}{150} \text{ and } \frac{x}{90}$$

Water may be added to the crystallizer during the cooling, if desired, to compensate for loss by evaporation and to maintain the aqueous liquid concentration approximately constant.

One of the advantages of the present invention is the fact that it makes possible a ready and complete separation from the aqueous liquid of oily impurities removed from the naphthalene, and the recovery of such oils as a by-product. Ordinarily the oily impurities accompanying naphthalene in crude naphthalene have a specific gravity close to that of water; accordingly gravity separation of these oils from water is difficult and time-consuming. In such cases the aqueous liquid used in the present invention is preferably a solution having a specific gravity substantially higher than that of water. When it is desired to recover tar-acids directly from the naphthalene crude, as is usually the case, this solution is preferably a caustic soda solution (although caustic potash could also be used) and the examples given below are based on the use of caustic soda. Where it is not desired to extract tar-acids from the crude, e. g. where it is desired to produce a tar-acid oil as a by-product of the naphthalene purification, sodium sulfate or sodium chloride solutions can satisfactorily be used.

In cases where the oily impurities separated from the naphthalene have a specific gravity substantially lower or higher than water, the process of the present invention may ordinarily be carried out with the use of water instead of an aqueous solution. In the case of heavier oils the crystals and the oil from which the crystals form will settle to the bottom of the tank and the water will rise to the top after crystallization is completed. If such oils are contaminated (e. g. with tar) they may tend to form emulsions with water and separation may become difficult and time-consuming in spite of the difference in specific gravities of the liquids. The use of a salt solution of higher specific gravity than oil is then preferred since it promotes separation of the aqueous and oily liquids, the latter rising to the surface.

Since the temperature obtainable by vacuum evaporation may be lower than the temperature of commonly and economically available cooling liquids, I may readily and economically obtain temperatures as low as or lower than the prevailing atmospheric temperature and thus may obtain optimum yield of crystallized naphthalene. Furthermore, since heat is abstracted by evaporation within the liquid, solid cooling surfaces are done away with and the problem of preventing deposits on them is eliminated. Insulation of tank surfaces effectively prevents crystallization of naphthalene thereon.

In my preferred embodiment the aqueous liquid has a specific gravity greater than that of the non-aqueous liquid phases present during the operation (usually in the neighborhood of 1), and less than that of the naphthalene crystals formed, about 1.15. Accordingly the molten naphthalene and impurities float on the aqueous liquid and the crystals as fast as formed tend to settle to the bottom of the crystallizing tank. As pointed out below this facilitates draining and washing of the crystals.

Cooling in my process is effected chiefly by evaporating liquid under a vacuum. I prefer to carry out the process so that evaporation of the aqueous liquid occurs at or near the upper surface of the layer of molten naphthalene in order to avoid bumping and priming. This is satisfactorily accomplished by admitting near the bottom of the tank a small amount of air or other inert gas which agitates the charge, entraining relatively finely divided masses of aqueous solution upwards; with suitably regulated vacuum the hydrostatic pressure of the molten naphthalene prevents boiling of the mass of the aqueous solution at the bottom of the tank, but the lower pressure existing at higher levels causes evaporation of the aqueous solution. This arrangement has the advantages of providing smooth operation and ready auxiliary control of vacuum by regulation of the air current. Control of vacuum in turn controls evaporating conditions and consequently rate of heat absorption and crystallization. The evaporation may range from surface evaporation to vigorous boiling of the entrained aqueous drops. As pointed out below, the rate of evaporation and consequent rate of heat removal and of crystallization are important factors in the present process.

In place of the air or gas, suitable mechanical agitators or pumps may be used to bring the aqueous solution, preferably in the form of droplets, to the upper surface of the naphthalene, suitable provision being made for vacuum regulation.

While in my preferred process I carry out the major part of the evaporation at or near the surface of the molten naphthalene, conditions can also be so arranged that substantial evaporation occurs (a) in the vapor space over the naphthalene, by pumping the aqueous solution from the lower part of the tank to a nozzle or spray head located in the vapor space; (b) at an intermediate level, by pumping the aqueous liquid to a nozzle or distributor head located at a desired point between the bottom and top of the naphthalene layer, or (c) at the bottom of the naphthalene layer by not circulating the aqueous solution to higher levels. In all cases suitable combinations of temperature and vacuum must be chosen, the hydrostatic pressure of the naphthalene at the evaporation level and the extent of concentration of aqueous solution due to evaporation being taken into account.

The choice between modifications (a), (b), (c) and the above described preferred process will depend largely on the size and shape of the equipment used. Experiment confirmed by commercial operation has shown that the process gives smoothest and most satisfactory operation when a tall crystallizer is used containing a relatively deep layer of molten naphthalene. This is also the most compact form of apparatus, and most economical of floor space. Modification (c), at the other extreme, can be made to work well especially where relatively shallow layers of molten naphthalene are present.

In my process the extent of the instantaneous refrigeration effect of any particle of aqueous liquid upon surrounding crystallizing naphthalene is readily controlled to avoid thermal shock which in processes heretofore known has been responsible for undesirably rapid local chilling with consequent formation of excessively fine crystals and of injurious crystal clusters or lumps. In the preferred process not only is the rate of heat removal by evaporation of water from individual aqueous particles readily controlled but also the instantaneous temperature difference between the cooling medium and the crystallizing naphthalene is so small that ill effects of thermal shock are practically avoided.

Control of crystal size within desired optimum limits is therefore readily accomplished.

As above mentioned, during crystallization water may, if desired, be drawn off by a suitable pump, and returned through a pressure release nozzle into the vapor space above the body of naphthalene. A part of the evaporation of the water and consequent cooling thereof will take place in the vapor space and the resultant cold water will thereupon fall into the body of naphthalene. The naphthalene supplies heat to the water, raises its temperature, and effects further evaporation, while being cooled and crystallized. Where in the appended claims I refer to reducing the pressure on the mixture of naphthalene and aqueous liquid so as to effect evaporation of water from the aqueous liquid, it should be understood that I intend to include this alternative method of operation. It is of course to be understood that the degree of vacuum will be regulated, with such operation, to effect the desired degree of heat removal at the desired rate and to avoid undesirably great differential in temperature between the crystallizing naphthalene and the cooling fluid.

It has long been known that too great a temperature difference between crystallizing naphthalene and cooling liquid in direct contact with it tends to produce large amounts of very small crystals and relatively large crystal aggregates that occlude mother liquor.

In the present process the temperature difference between boiling solution and adjacent naphthalene appears to be infinitesimal, and may be considered as continuously destroyed and reestablished by the crystallizing and boiling processes respectively. The rate of this transfer of heat, ultimately dependent on the boiling rate, may be regulated so as to control rate of naphthalene crystallization throughout the operation. The optimum crystallization rate expressed in terms of percent of actual naphthalene originally present in the crude which is crystallized per unit time decreases with increase in the depth of the naphthalene layer in the crystallizer; in the case of apparatus of the ordinary commercial sizes, this rate varies little with small differences in the diameter of the crystallizer, but large increases in diameter require slower operation for the best results, possibly because of the difficulty of maintaining uniform conditions across large areas.

Because of the elimination of unduly fine crystals and of undesirable crystal clusters in my process, the crystalline product may be further purified to advantage by washing it with a solvent, for example, coal-tar naphtha, petroleum naphtha, or iso-propyl alcohol. The wash liquid, in addition to being a solvent for the oil impurities, preferably is a relatively poor solvent for naphthalene and has a boiling range sufficiently different from that of naphthalene to permit easy separation by distillation. A solvent with lower boiling range than that of naphthalene is usually better for the purpose than one with higher boiling range. This washing step removes oil adhering to the crystals after the crystallization. In two crystallizations and drainings followed by coal-tar naphtha washings, I have been able without removal of naphthalene from the apparatus to convert crude naphthalene of 64° solidification point into products having solidification points as high as 79.3° C. after removal of the naphtha. This marked rise in solidification point appears due to the precise control of crystal formation, made possible by my invention with consequent efficient removal of oils and other impurities by my process and is attended by a relatively low accompanying loss of naphthalene as compared with previous processes.

Products may be made from clean commercial crudes by my process of such purity that upon evaporation in air they leave no residue and do not stain cloth materials with which they are brought into contact. As a consequence they may be used directly for such purposes as mothproofing garments, whereas in the past the commercial napthalene products were not suitable for this use until after they had been subjected to further treatment, as washing with sulfuric acid and subsequent sublimation (or at least to the latter step).

I have found that with a crystallizing tank 5 feet in diameter, having a cone bottom 30 inches deep and containing (measuring from the bottom of the cylindrical portion) a layer of caustic about 4 feet deep and a layer of molten naphthalene about 12 feet deep, the crystals of maximum value, i. e. most easily and completely separable from residual liquid by draining, may be obtained by cooling a crude, for example one having a solidification point in the range 55°–74° C., at such a rate that between about 10% and about 15% of the total initial actual naphthalene content crystallizes out in each hour of cooling. Further, the higher the initial purity of the naphthalene, the more rapid the rate of cooling may be to yield satisfactory results; for instance, with a 65° C. solidification-point naphthalene a rate of 10% per hour is preferred but with a 73° C. solidification-point naphthalene a rate of 12% to 13% per hour is preferred.

As pointed out above, this process yields crystals of the type disclosed in Gould United States Patent 1,488,688, the liquefied crystallizing naphthalene being in contact with a suitable amount of water or aqueous solution; this is true even where extremely slow and extremely fast rates are employed. The special advantage of obtaining crystals of this kind is largely due to the fact that the bulk of crystals produced is formed of aggregates of individual leaflets adhering to each other along the plane of the basal pinacoid; these aggregates are relatively free of cavities capable of occluding mother liquor and consequently can be relatively completely freed from mother liquor by draining, filtering, pressing or washing, etc. When the crystals are formed by my process under the optimum conditions above described, the aggregates are of sufficient size to permit relatively complete drainage by gravity; hence filter-pressing or equivalent operations may be dispensed with. Even if, however, the crystallization rate is increased to such a point that aggregates are formed which are too fine for satisfactory gravity drainage, they may be freed of oils, water, etc. by pressing, centrifuging, etc., as in prior processes.

The following example illustrates the manner of carrying out the process of my invention—

Example: 17,700 gallons of molten crude naphthalene having a solidification point of 62° C. and containing approximately 61% naphthalene, 39% impurities (consisting mainly of hydrocarbon oils but also small amounts of tar-acids) are charged to a crystallizing tank; a vertical cylindrical tank 15 feet in diameter and provided with a conical bottom will do, the naphthalene layer in it being about 13.4 feet deep. The tank is fitted with a screened bottom outlet to permit drawing off liquid from crystals. Alternatively the draining may be carried out in a separate draining tank so fitted. 7,600 gallons of a 5% sodium hydroxide solution at a temperature of about 65°–70° C. are then introduced into the crude liquid naphthalene charge. Since the crude liquid naphthalene has a specific gravity slightly less than one, it rises to form a layer above the sodium hydroxide solution.

The pressure within the vessel is now gradually reduced in any suitable manner. A convenient method for accomplishing the pressure reduction comprises the use of a steam ejector or a series of steam ejectors. In order to control the pressure, a small, regulated amount of air may be led into the system under evacuation at any convenient point. The charge, which is at a temperature around 70° C., may be cooled as rapidly as desired down to but preferably not below about 65° C. Consequently the primary consideration in controlling the degree of vacuum during this initial phase of the cooling process is to prevent "bumping" or "boiling over" of the liquids in the crystallization vessel. When the temperature reaches the point at which the crystallization of naphthalene commences, in order to produce crystals of optimum characteristics from the standpoint of further purification, the cooling is preferably regulated so as to effect crystallization of naphthalene at a rate of about 10% of the total naphthalene content of the charge per hour of cooling.

To accomplish this a cooling schedule on the order of the following may be employed:

|  | From— °C. | To— °C. |
| --- | --- | --- |
| First hour | 65 | 64 |
| Second hour | 64 | 63 |
| Third hour | 63 | 61 |
| Fourth hour | 61 | 59 |
| Fifth hour | 59 | 56 |
| Sixth hour | 56 | 52 |
| Seventh hour | 52 | 47 |
| Eighth hour | 47 | 40 |
| Ninth hour | 40 | 30 |

It will be appreciated that since cooling in the above example is controlled by the degree of vacuum or in other words by the absolute pressure within the crystallizer and since the vapor pressure of the aqueous liquid becomes lower as the temperature becomes lower, it is necessary to reduce the absolute pressure gradually during the process. Thus, while the sodium hydroxide solution may boil initially at an absolute pressure of about 400 to 450 mm. of mercury, the final pressure required may be as low as 20 to 50 mm. of mercury to maintain the above temperature schedule.

The evaporation of water reduces the quantity of sodium hydroxide solution in the charge as crystallization proceeds and make-up water may be added to the charge as water is evaporated and may if desired be in excess of that so removed. The added water serves to keep the specific gravity of the aqueous solution evenly balanced between that of liquid naphthalene and that of the crystallized naphthalene so that the crystals, when formed, settle to the bottom of the crystallizer; it also seems to avoid irregular operating conditions due to excessive variations in aqueous vapor pressure. The water added should preferably be at the temperature of the charge at the time the addition is made. If water is added continuously or in small increments, its temperature may be atmospheric since the cooling effected by the addition of small amounts of water will not appreciably affect the temperature of the charge. The total amount of make-up water will not appreciably affect the temperature charge of crude naphthalene may amount to 1,700 gallons of water or more depending upon the incidental cooling effect of the surrounding atmosphere.

During the cooling I prefer to introduce air through a suitable distributing device near the bottom of the crystallizer to effect a mild agitation of the liquids and to distribute the sodium hydroxide solution through the naphthalene. Only a small amount of air is supplied in this manner, e. g. for a tank 5 feet in diameter as described above,—approximately 8–10 cubic feet per minute (measured at 20° C. 760 mm. pressure); for a tank 15 feet in diameter as described above, I may use approximately 60 cubic feet per minute.

Alternatively a large amount of air may be circulated through the liquids to effect a substantial amount of the evaporation; in this case the pressure over the liquid need not be reduced to the same extent as when only a small amount of air is used. In the majority of cases, however, the use of vacuum to effect practically all the evaporation as above described will be most economical and convenient.

By reducing the temperature to about 30° C. about 90% of the actual naphthalene initially present in the crude material may be crystallized. The temperature may be reduced further, e. g., to 25° or 20° C. if desired with a gain in yield and some sacrifice in purity of crystals. The stopping point will depend in part on economic considerations, and on the ultimate grade of product desired.

When the end temperature is reached, liquid is withdrawn from the crystallizer. Preferably oil is withdrawn first from the upper portion of the crystallizer (the crystals having settled to the bottom) and sodium hydroxide solution is then withdrawn from the bottom. In this manner the oil during draining does not pass through the mass of naphthalene crystals and hence the crystals will retain less oil than if the liquids are drawn off entirely from the bottom of the apparatus. The crystals may be allowed to drain for about 8 or 9 hours or longer. The oil separated from the crude naphthalene in this manner will amount to about 10% to 15% of the total initial crude naphthalene. I prefer, however, to drain off the major portion of liquid, which requires only a half hour or so and then to wash the crystals with additional cold dilute sodium hydroxide solution, e. g. at 20–25° C. This procedure has the advantage that it may be employed to further reduce the temperature as low as 20° C., so that in the subsequent solvent-washing step a minimum amount of naphthalene will be dissolved. Furthermore, only 5 or 6 hours are required for draining off the weak caustic solution in this auxiliary wash. I may also wash with caustic during the draining period.

If the drained crystals are melted, practically all caustic may be separated from the molten layer by gravity. The resultant naphthalene will have a solidification point of approximately 74° C. This product is an important commercial grade. If material of higher solidification point is required, the following procedure may be used:

The drained and caustic-washed crystals are washed with coal-tar naphtha having a boiling range of 115° to 175° C., for example. The solvent employed in this step is preferably that which has previously been employed in a subsequent, i. e., secondary, similar washing step and which has been saturated with naphthalene thereby. This solvent is preferably introduced into the crystallizer so as to flood the crystals contained therein. After agitating the crystals with the solvent for 5 or 10 minutes, as by blowing or sucking air into the bottom of the crystallizer, solvent is drained off over a period of 8 or 9 hours. A suitable petroleum naphtha or other solvent may be used instead of the coal-tar naphtha.

The naphthalene crystals, which possess an "as is" solidification point of 71° to 73° C., may be freed of solvent by distillation to yield a product of 78° C. or higher solidification point suitable for use for many purposes without further purification.

To produce a product of higher purity, the 71° to 73° C. "as is" solidification-point crystals from the first crystallization are melted and mixed with 7,000 gallons of 5% sodium hydroxide solution and cooled by much the same method as in the first purification. In view of the fact that the solidification point of the partly purified product is substantially higher than that of the crude material of 65° C. solidification point, a different cooling schedule is preferred for optimum crystallization results. The material now contains approximately 86% naphthalene, 10% wash-solvent, and 4% hydrocarbon oil impurities. Cooling is effected as in the first crystallization in a manner to effect the crystallization of approximately equal quantities of naphthalene over equal periods of time. Thus a schedule on the following order may be used:

|  | From— | To— |
|---|---|---|
|  | °C. | °C. |
| First 45 minutes | 73 | 71 |
| Second 45 minutes | 71 | 70 |
| Third 45 minutes | 70 | 69 |
| Fourth 45 minutes | 69 | 67 |
| Fifth 45 minutes | 67 | 65 |
| Sixth 45 minutes | 65 | 62 |
| Seventh 45 minutes | 62 | 56 |
| Eighth 45 minutes | 56 | 48 |
| Ninth 45 minutes | 48 | 33 |
| Tenth 45 minutes | 33 | 20 |

This effects crystallization of about 94% of the total actual naphthalene content of the initial 71° to 73° material. The draining of oil and sodium hydroxide solution from the crystallized product may be effected in about 7 or 8 hours. Since the residual oil is largely relatively low-boiling solvent oil as distinguished from the hydrocarbon impurities associated with the crude, the oil retained by the crystals contains only a small quantity of these original hydrocarbon impurities, the major portion being wash-solvent readily separable by distillation. The crystals are washed with additional solvent naphtha sufficient to flood the crystals and the washing oil is drained from the crystals. The washing oil thus drained from the naphthalene crystals is suitable for use in the first solvent washing step above described.

A small amount of solvent remains on the naphthalene, normally from 7% to 10% of the naphthalene by volume. This product is subjected to distillation to separate naphthalene and solvent. Depending on the particular type of crude naphthalene employed, the yield of purified naphthalene recovered as distillation residue amounts to 9,700 to 10,600 gallons. The naphthalene product has a solidification point of 79° to 79.25° C. and may be used commercially in this condition or may be further purified, e. g., by sublimation or distillation. If it is desired to convert it to a flake form such as commonly used for moth-proofing and similar purposes, it may be sublimed; in this case an intermediate sulfuric acid wash may, if desired, be omitted.

In cases where the residual oil, from which the naphthalene has crystallized, is of such high viscosity under operating conditions as to prevent or interfere with drainage from the crystals by solvent, the crude naphthalene may be diluted before crystallization with solvent of sufficiently low viscosity to permit subsequent drainage of oil from the crystals. I prefer to use a solvent of lower vapor pressure than water to avoid the necessity of adding excessive amounts to make up for solvent lost by evaporation. Evaporation of solvent, however, contributes to the cooling effect and hence to crystal formation.

In the above process, wherein the naphthalene temperature during crystallization is controlled by regulating the absolute pressure on the system, a small amount of naphthalene may be vaporized along with the water or other cooling medium. In order to recover this vaporized naphthalene, a condenser of any suitable type may be employed, although the direct type is preferred. For cooling fluid in this condenser I may employ sodium hydroxide, contacting it directly with the vapors being cooled. The naphthalene may be recovered from the cooling medium.

It is to be understood that, while the present invention makes practicable the purification of naphthalene without the use of centrifuges, filter presses or the like, these means for separating liquid and solid may be used in conjunction with the invention where special conditions make it advisable.

Naphthalene from various sources, e. g. from carburetted-water-gas tar and from other products of petroleum origin, as well as that from coal-distillation processes, may be liquefied and successfully crystallized by the process of this invention.

I claim:

1. The process of producing naphthalene in the form of aggregates of individual crystals, said crystals being firmly bonded together along their basal planes, which comprises mixing the naphthalene in liquid phase with an aqueous liquid, evaporating a portion of the liquid from the mixture so as to reduce the heat content of the mixture and thereby effect crystallization of the naphthalene, and regulating the rate of cooling so that the time in hours for crystallizing each 1% of the actual naphthalene originally present in the impure material is not less than $$\frac{x}{240}$$

where $x$ represents the height of the initial naphthalene layer in feet.

2. In the purification of naphthalene by crystallization in the presence of an aqueous liquid, the improvement which comprises contacting impure naphthalene and aqueous liquid at a temperature at which a substantial part of the impure naphthalene is liquid and reducing the pressure on the mixture so as to effect evaporation of water from the aqueous liquid and consequent cooling of the mixture to a temperature at which naphthalene crystallizes, and regulating the rate of cooling so that the time in hours for crystallizing each 1% of the actual naphthalene originally present in the impure material is not less than $$\frac{x}{240}$$

where $x$ represents the height of the impure naphthalene layer in feet.

3. In the purification of naphthalene by crystallization in the presence of an aqueous liquid, the improvement which comprises effecting agitation of naphthalene containing liquid impurities and an aqueous liquid, having a specific gravity under the conditions of operation greater than the specific gravity of the liquefied naphthalene and of the liquid impurities and less than that of the naphthalene crystallized, at a temperature at which a substantial part of the impure naphthalene is liquid, and reducing the pressure on the mixture so as to effect evaporation of water from the aqueous liquid and consequent cooling of the mixture to a temperature at which naphthalene crystallizes, and regulating the rate of cooling so that the time in hours for crystallizing each 1% of the actual naphthalene originally present in the impure material is not less than $$\frac{x}{240}$$

where $x$ represents the height of the impure naphthalene layer in feet.

4. In the purification of impure naphthalene containing oily impurities by crystallization in the presence of an aqueous liquid, the improvement which comprises effecting agitation of the impure naphthalene and aqueous liquid at a temperature at which a substantial part of the impure naphthalene is liquid and reducing the pressure on the mixture so as to effect evaporation of water from the aqueous liquid and consequent cooling of the mixture to a temperature at which naphthalene crystallizes, regulating the rate of cooling so that the time in hours for crystallizing each 1% of the actual naphthalene originally present in the impure material is not less than $$\frac{x}{240}$$

where $x$ represents the height of the impure naphthalene layer in feet, separating the resultant naphthalene crystals from residual oil and aqueous liquid and washing the crystals with a solvent separable from naphthalene by distillation.

5. In the purification of impure naphthalene by crystallization in the presence of a dilute sodium hydroxide solution, the improvement which comprises agitating the impure naphthalene and dilute sodium hydroxide solution at a temperature at which the impure naphthalene is liquid, reducing the pressure on the mixture so as to effect evaporation of water from the dilute sodium hydroxide solution and consequent cooling of the mixture, thereby causing crystallization of naphthalene, and regulating the rate of cooling so that the time in hours for crystallizing each 1% of actual naphthalene originally present in the impure material is not less than $$\frac{x}{240}$$

where $x$ represents the height of the impure naphthalene layer in feet.

6. In the crystallization of naphthalene in the presence of a dilute sodium hydroxide solution, the improvement which comprises contacting the naphthalene and dilute sodium hydroxide solution at a temperature at which the naphthalene is liquid, reducing the pressure on the mixture so as to effect evaporation of water from the dilute sodium hydroxide solution and consequent cooling of the mixture to a temperature at which naphthalene crystallizes, regulating the rate of cooling so that the time in hours for crystallizing each 1% of the actual naphthalene originally present in the impure material is between $$\frac{x}{15}$$

and $$\frac{x}{240}$$

where $x$ represents the height of the impure naphthalene layer in feet, and admitting a gas gradually into the body of naphthalene to effect agitation thereof during said crystallization.

7. In the purification of crude naphthalene containing tar-oil and tar-acid impurities by crystallization in the presence of a dilute sodium hydroxide solution, the improvement which comprises contacting the crude naphthalene and dilute sodium hydroxide solution at a temperature at which the crude naphthalene is liquid and reducing the pressure on the mixture so as to effect evaporation of water from the dilute sodium hydroxide solution and consequent cooling of the mixture to a temperature at which naphthalene crystallizes, regulating the rate of cooling so that the time in hours for crystallizing each 1% of the actual naphthalene originally present in the crude material is not less than $$\frac{x}{240}$$

where $x$ represents the height of the crude naphthalene layer in feet, draining off residual oil and alkaline solution from the naphthalene crystals and washing them with aqueous dilute sodium hydroxide solution and then with a solvent for the impurities which is separable from naphthalene by distillation.

8. In the purification of crude naphthalene containing tar-oil and tar-acid impurities having a solidification point within the range 55°–74° C. by crystallization in the presence of a dilute sodium hydroxide solution, the improvement which comprises agitating the crude naphthalene and dilute sodium hydroxide solution at a temperature at which the crude naphthalene is liquid, reducing the pressure on the mixture so as to effect evaporation of water from the dilute sodium hydroxide solution and consequent cooling of the mixture to a temperature at which naphthalene crystallizes, controlling the pressure so as to effect progressive crystallization of naphthalene at a rate such that $y$, the time in hours for crystallizing 1% of the actual naphthalene originally present in the crude, is in the range $$\frac{x}{90} \text{ to } \frac{x}{150}$$

where $x$ represents the height in feet of the crude naphthalene layer, draining off residual oil and alkaline solution from the resultant naphthalene crystals, washing them with a hydrocarbon oil solvent separable from the naphthalene by distillation, melting the crystalline naphthalene, mixing the molten naphthalene with dilute sodium hydroxide solution at a temperature above the melting point of the naphthalene, reducing the pressure on the mixture so as to evaporate water therefrom and cool the mixture at such a rate that $y$, the time in hours for crystallizing 1% of the actual naphthalene originally present in the crude, is in the range $$\frac{x}{90} \text{ to } \frac{x}{150}$$

where $x$ represents the height in feet of the molten naphthalene layer, thereby recrystallizing the naphthalene, washing the recrystallized naphthalene with additional hydrocarbon oil solvent for the impurities which is separable from the naphthalene by distillation, and fractionally distilling the mixture to effect separation of residual solvent.

STUART P. MILLER.